United States Patent
Mitra et al.

(10) Patent No.: US 8,182,783 B2
(45) Date of Patent: May 22, 2012

(54) RAPID MICROWAVE PROCESS FOR PURIFICATION OF NANOCARBON PREPARATIONS

(75) Inventors: Somenath Mitra, Bridgewater, NJ (US); Yuhong Chen, Frederick, MD (US)

(73) Assignee: New Jersey Institute of Technology, Newark, NJ (US)

( * ) Notice: Subject to any disclaimer, the term of this patent is extended or adjusted under 35 U.S.C. 154(b) by 462 days.

(21) Appl. No.: 11/600,384

(22) Filed: Nov. 16, 2006

(65) Prior Publication Data

US 2010/0086470 A1 Apr. 8, 2010

(51) Int. Cl.
*B82B 3/00* (2006.01)
(52) U.S. Cl. ........................... 423/461; 977/845
(58) Field of Classification Search .................. 423/461; 977/845

See application file for complete search history.

(56) References Cited

U.S. PATENT DOCUMENTS

| | | | |
|---|---|---|---|
| 6,841,003 B2 * | 1/2005 | Kang et al. ................ | 117/92 |
| 6,972,056 B1 * | 12/2005 | Delzeit et al. ................ | 134/1 |
| 7,494,638 B1 * | 2/2009 | Huffman et al. .......... | 423/445 B |
| 2003/0042128 A1 * | 3/2003 | Harutyunyan et al. .... | 204/158.2 |
| 2006/0062718 A1 * | 3/2006 | Bahr et al. ................ | 423/461 |
| 2006/0210466 A1 | 9/2006 | Mitra et al. | |

FOREIGN PATENT DOCUMENTS

WO  WO 2006099392 A3  9/2006

OTHER PUBLICATIONS

Tohji et al., 'Purifying Single Walled nanotubes' in Nature vol. 383 p. 679 Oct. 24, 1996.*
S. Iijima, "Helical Microtubules of Graphitic Carbon," 354 Nature 56-58 (1991).
T. Guo et al., "Catalytic Growth of Single-Walled Nanotubes by Laser Vaporization," 243 Chemical Physical Letters 49-54 (1995).
P.C. Ecklund et al., "Large-Scale Production of Single-Walled Carbon Nanotubes Using Ultrafast Pulses from a Free Electron Laser," 2(6) Nano Letters 561-566 (2002).
C. Journet et al., "Large-Scale Production of Single-Walled Carbon Nanotubes by the Electric-Arc Technique," 388 Nature 756-758 (1997).
P. Nikolaev et al., "Gas-Phase Catalytic Growth of Single-Walled Carbon Nanotubes from Carbon Monoxide," 313 Chemical Physics Letters 91-97 (1999).
Y. Wang et al., "The Large-Scale Production of Carbon Nanotubes in a Nano-Agglomerate Fluidized-Bed Reactor," 364 Chemical Physics Letters 568-572 (2002).
T. Kato et al., "Structure Control of Carbon Nanotubes Using Radio-Frequency Plasma Enhanced Chemical Vapor Deposition," 457 Thin Solid Films 2-6 (2004).
S.C. Lyu et al., "Large-Scale Synthesis of High-Quality Single-Walled Carbon Nanotubes by Catalytic Decomposition of Ethylene," 108 J. Phys. Chem. B 1613-1616 (2004).
A.C. Dillon et al., "Continuous Hot Wire Chemical Vapor Deposition of High-Density Carbon Multiwall Nanotubes," 3(10) Nano Letters 1425-1429 (2003).
Y. Lin et al., "Functionalizing Multiple-Walled Carbon Nanotubes with Aminopolymers," 106 J. Phys. Chem. B 1294-1298 (2002).
D.E. Hill et al., "Functionalization of Carbon Nanotubes with Polystyrene," 35 Macromolecules 9466-9471 (2002).
Y. Lin et al., "Polymeric Carbon Nanocomposites from Carbon Nanotubes Functionalized with Matrix Polymers," 36 Macromolecules 7199-7204 (2003).
D. Ciuparu et al., "Uniform-Diameter Single-Walled Carbon Nanotubes Catalytically Grown in Cobalt-Incorporated MCM-41," 108 J. Phys. Chem. B 503-507 (2004).
J.J. Ge et al., "Multiwalled Carbon Nanotubes with Chemically Grafted Polyetherimides," 127 J. Am. Chem. Soc. 9984-9985 (2005).
Notification of Transmittal of the International Search Report and the Written Opinion of the International Searching Authority, mailed May 5, 2008 (8 pages).
Delgado et al., "Micro-wave-assisted sidewall functionalization of single-wall carbon nanotubes by Diels-Alder cycloaddition," Chem. Comms. No. 15 (2004) pp. 1734-1735.
Tasis et al., "Soluble Carbon Nanotubes," Chem. Eur. J. vol. 9 (2003) pp. 4000-4008.
Holzinger et al., "Sidewall Functionalization of Carbon Nanotubes," Angew. Chem. Int. Ed., vol. 40, No. 21 (2001) pp. 4002-4005.
Wang et al., "Contact-damage-resistant ceramic/single-wall carbon nanotubes and ceramic/graphite composites," Nature Materials, vol. 3 (Aug. 2004) pp. 539-544.
Kuzmany et al., "Functionalization of carbon nanotubes," Synthetic Metals 141 (2004) pp. 113-122.
Loupy, A., "Solvent-free microwave organic synthesis as an efficient procedure for green chemistry," C.R. Chimie 7 (2004) pp. 103-112.
Kamalakaran et al., "Microstructural characterization of C-SiC-carbon nanotube composite flakes," Carbon 42 (2004) pp. 1-4.
Lewis et al., "Accelerated Imidization Reactions Using Microwave Radiation," J. Polymer Sci.: Part A: Polymer Chem., vol. 30 (1992) pp. 1647-1653.
Gedye et al., "The use of microwave ovens for rapid organic synthesis," Te. Lett., vol. 27, No. 3 (1986) pp. 279-282. Giguere et al., "Application of Commercial Microwave Ovens to Organic Synthesis," Tet. Lett., vol. 27, No. 41 (1986) pp. 4945-4948.

* cited by examiner (Continued)

Primary Examiner — Stuart Hendrickson
(74) Attorney, Agent, or Firm — McCarter & English, LLP

(57) ABSTRACT

A novel microwave-assisted process is described for the rapid removal of catalytic metal and non-desirable carbon impurities in fullerene, single wall, and multiple wall carbon nanotube preparations. The purification process is carried out at various programmed pressures, power levels and reaction times in a suspension of the nanocarbon moieties in the presence of strong acids (for example, a mixture of sulfuric acid and nitric acid), in weak acids (for example, acetic acid) and in the presence of chelating agents (for example, EDTA—ethylenediaminetetraacetic acid). In one embodiment, high metal removal efficiency of 70 to 90% is observed.

31 Claims, 4 Drawing Sheets

(b)

(a)

RAPID MICROWAVE PROCESS FOR PURIFICATION OF NANOCARBON PREPARATIONS

FIELD OF THE INVENTION

Figure 1:
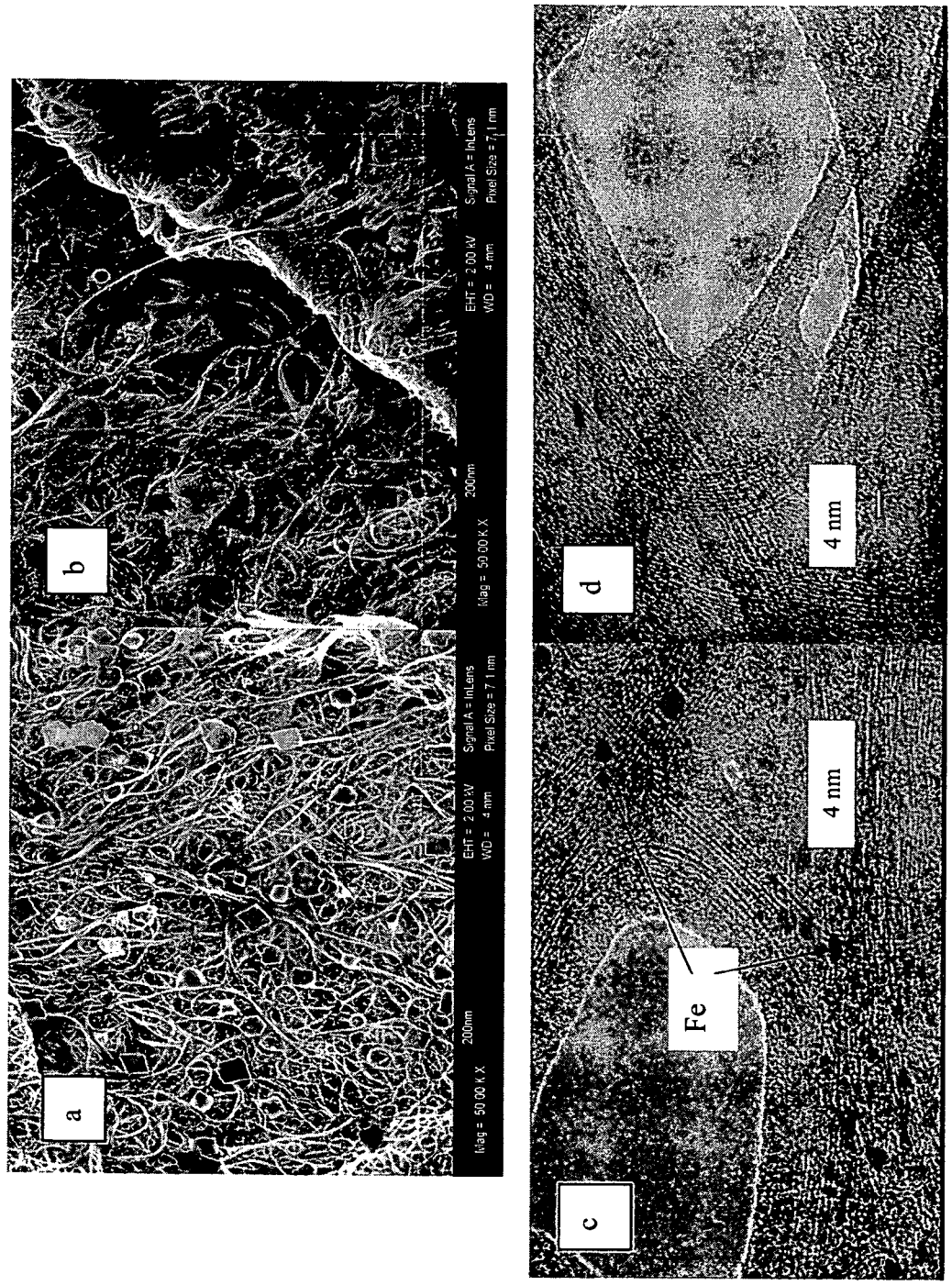

The present invention relates to the cleansing of nanocarbon preparations such as fullerenes including $C_{60}$, $C_{70}$, and nano-onions, and single wall and multiple wall carbon nanotubular fibers or nanotubes. In some embodiments, the invention relates to a rapid, environmentally friendly method, which is relatively low in processing cost.

BACKGROUND OF THE INVENTION

Since their first discovery by Iijima in 1991, single-walled carbon nanotubes (SWNTs) have attracted much attention due to their unique structural and electronic properties. Results on such materials have added to the body of knowledge gathering on spherical fullerenes, such as $C_{60}$, $C_{70}$, and rarer, higher fullerenes such as $C_{76}$, $C_{78}$, $C_{82}$ and $C_{84}$. Several processes for large-scale synthesis/manufacture of SWNTs have also been developed by various research groups around the globe, and nearly all of them use transition metal catalysts to catalyze the process. Among of these catalysts, iron, cobalt, and nickel are quite common, with molybdenum typically used as a promoter. For example the high-pressure carbon monoxide (CO) (HiPCO) used by Carbon Nanotechnologies Inc (CNI) uses Fe as the catalyst. Typically, the carbon nanotubes (CNTs) produced by these methods usually contain both residual catalytic metal and nontubular carbonaceous species such as amorphous carbon, microcrystalline carbon soot or graphitic carbon. Fullerene synthesis, for example from graphite rods via arc discharge evaporation, may also result in the presence of carbon and metal impurities. These impurities are difficult to control, and are largely buried in the powdery support material or enclosed by the catalytic metal in the form of so-called onionated structure, and are therefore difficult to remove. Despite sustained efforts at conventional purification protocols in prior art efforts, there still exist significant quantities of the above mentioned impurities in all SWNT preparations using currently employed synthetic techniques. This necessitates the development of efficient, cost-effective and environmentally-friendly purification procedures, without which this unique material will have limited applications.

The conventional method used for purification of raw CNTs is by an acid treatment process to remove impurities which is time-consuming, and generally requires several days of stirring or refluxing or several hours of sonication. Moreover, all these methods lead to chemical-functionalization of the sidewalls and tips of the nanotubes resulting in modification or degradation of physical properties and defect-induced structural damage of the nanotubes. So, rapid and efficient purification methods are needed to dissolve the metal particles and concomitantly oxidize the amorphous carbon structures without damaging the nanotubes. Nanotube clean up is a key technology for successful commercialization of these materials. Current methods have limitations because they do not address all the complexities involved in the process. No off-the-shelf technology is directly applicable either. The important feature of a suitable technique would be able to selectively remove metals, contaminants and residual non-tubular carbons while leaving the nanotubes undamaged.

This invention describes in some embodiments a rapid, efficient and environmentally friendly microwave-induced process for the removal of residual transition metal catalysts and non-desirable carbonaceous materials from nanocarbon preparations.

SUMMARY OF THE INVENTION

The present invention describes methods for the removal of contaminants, process aids and intermediates not limited to and comprising of catalytic metals like iron, cobalt and nickel and non-desirable carbons from nanocarbon preparations. The purification process is microwave assisted reaction in presence of appropriate chemicals, not limited to but including strong acids, such as, nitric and sulfuric acids, weak acids like acetic acid, weak bases such as sodium bicarbonate, strong bases such as potassium hydroxide, and metal chelating agents like ethylenediaminetetraacetic acid (EDTA). In another embodiment, mixtures of the above chemicals can also be used for purification. Microwave reactions under different microwave power levels, reaction pressures and times have been successfully employed. Metal removal efficiencies have been determined and purified nanotubes have been obtained.

In another aspect of the present invention, microwave reactions in appropriate chemicals, not limited to but including acids and oxidizing agents under microwave radiations have been used to remove non-tubular carbon structures and other contaminants from carbon nanotube sidewalls. These and other features, aspects and advantages of the present invention will become better understood with reference to the following drawings, description and claims.

Other embodiments provide methods for purifying spherical nanocarbon preparations, such as $C_{60}$, $C_{70}$, higher fullerenes, and nano-onions. Contaminants of these preparations include soot, graphite, amorphous carbon, and even nanotubular carbon in some cases. Some embodiments expose spherical nanocarbon preparations to appropriate amounts of microwave radiation in the presence of suitable removing agents. Such removing agents include, but are not limited to, strong acids, such as, nitric and sulfuric acids, weak acids like acetic acid, weak bases such as sodium bicarbonate, strong bases such as potassium hydroxide, and metal chelating agents like ethylenediaminetetraacetic acid (EDTA).

In some embodiments, the method does not functionalize the nanocarbon preparation. That is, the removing agent for example, acts only to remove the contaminants, either selectively or unselectively, from the nanocarbon preparation. In such an embodiment, the nanocarbon structures themselves are not modified or derivatized by the method. In other embodiments, the nanocarbon is modified in the method. In those embodiments, the modified nanocarbon exhibits properties desired by or useful to the person applying the method. In other embodiments, the modification is not significant, and the modified nanocarbon is an acceptable material in spite of the modification.

BRIEF DESCRIPTIONS OF THE DRAWINGS

FIG. 1: SEM images of an (a) original SWCNTs preparation, and (b) SWCNTs after 15 mins microwave assisted reaction in 1M $HNO_3$ TEM images of an (c) original SWCNTs preparation, and (d) purified SWNT after 20 mins microwave iron removal reaction in 1M $HNO_3$ Solvent (Scale Bar: 200 nm).

Figure 2:
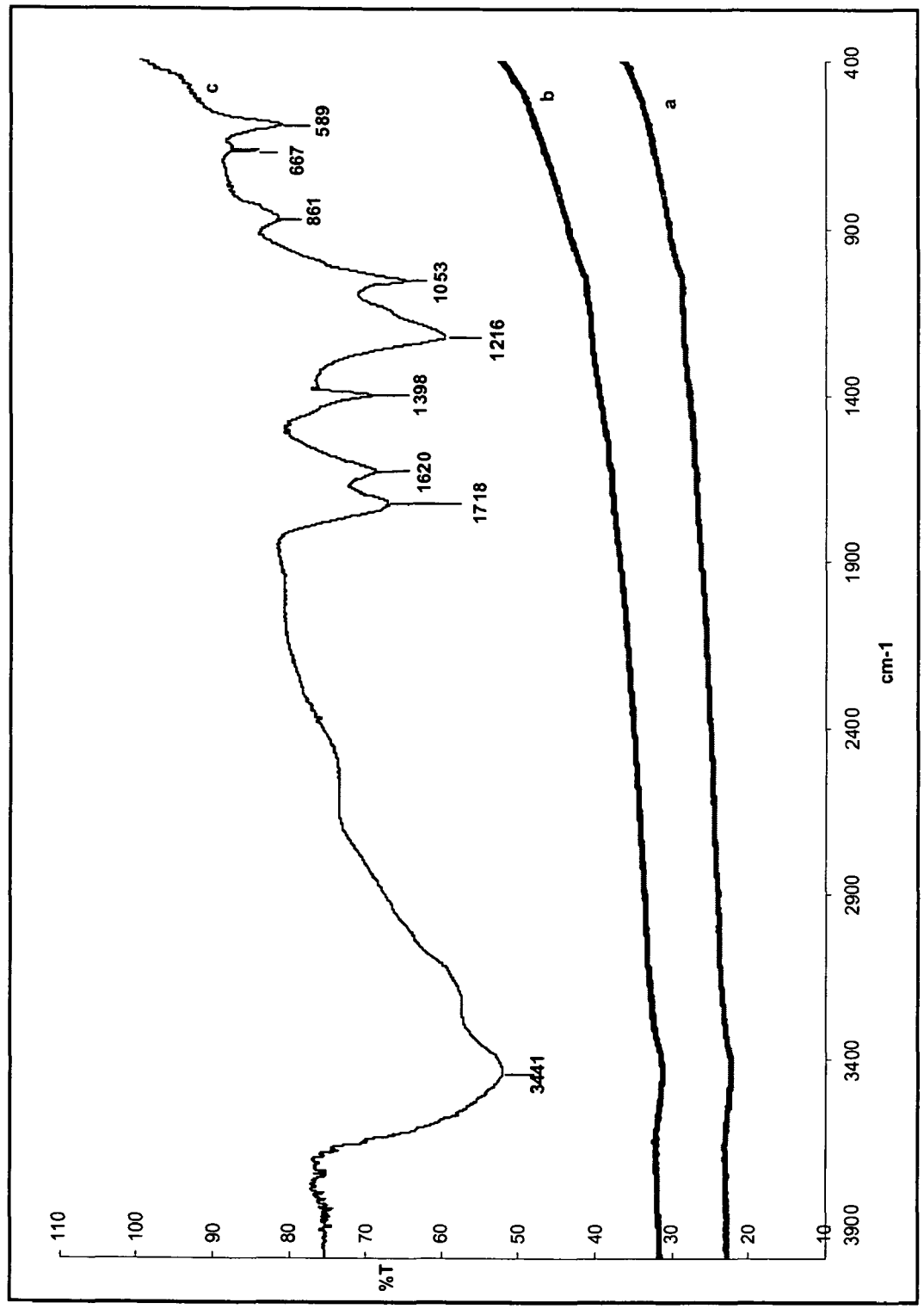

FIG. 2: Fourier-transform infrared spectrum of: (a) original single wall carbon nanotubes (SWNTs), (b) SWNTs after 10 minutes reaction in 1M $HNO_3$ to remove catalyst metals, and (c) SWNTs obtained after solvent evaporation from high concentration SWNT solution in nitric acid-sulfuric acid mixture.

Figure 3:
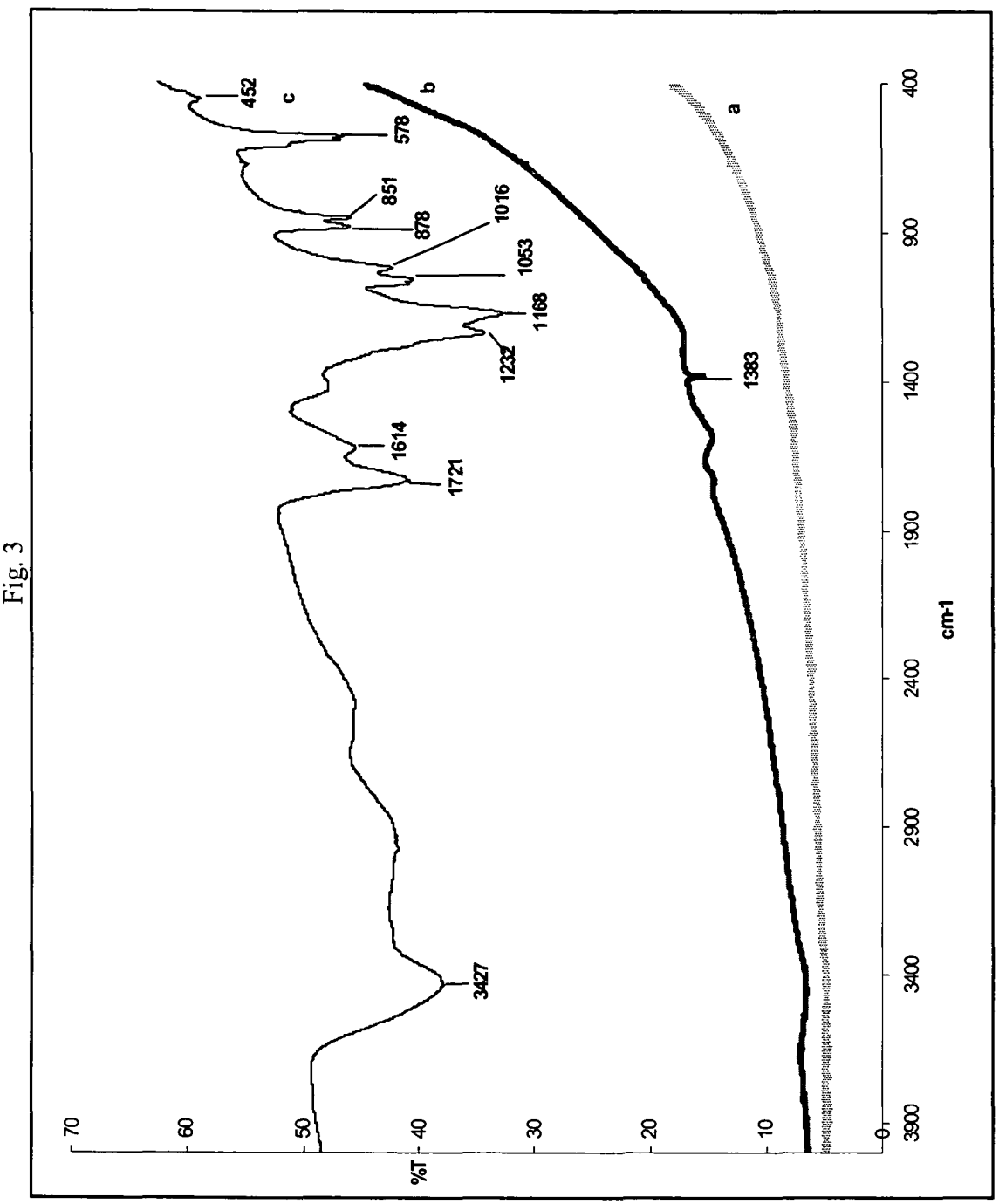

FIG. 3: Fourier-transform infrared spectrum of: (a) original multiple wall carbon nanotubes (MWNTs), (b) MWNTs after 10 minutes reaction in 1M $CH_3COOH+EDTA$ solution, and (c) MWNTs obtained after solvent evaporation from high concentration MWNT solution in nitric acid-sulfuric acid mixture.

Figure 4:
Figure 4:
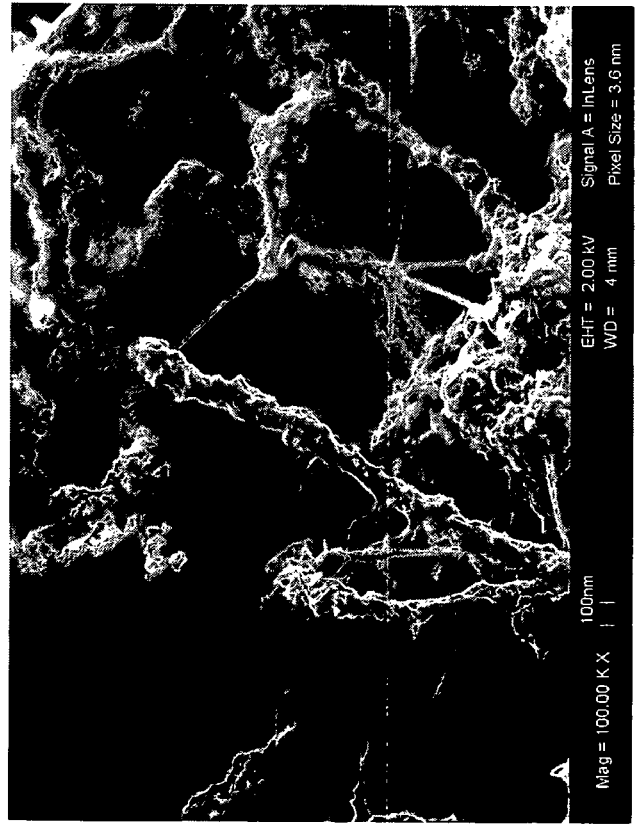

FIG. 4: Scanning electron microscope images of: (a) As-prepared multiwall carbon nanotubes with amorphous carbon growths on the surface, and (b) the same sample of multiwall carbon nanotubes after 10 minutes of low-level microwave treatment in a nitric acid-sulfuric acid mixture.

DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In some embodiments of the present invention, the process involves the microwave-assisted reaction between contaminants of nanocarbon preparations and other appropriate reagents. These reagents and combinations thereof may include but are not limited to strong and weak acids, oxidizing agents, chelating agents and their mixtures. In other embodiments, other chemicals that can bind to metals and those that can oxidize the contaminant carbons can also be used to remove them. The acids used in this process include, but are not limited to nitric acid, hydrochloric acid, sulphuric acids, organic acids such as acetic acids and mixtures and combinations thereof. An example of an oxidizing agent is hydrogen peroxide.

Some embodiments of the present invention employ a method to remove a portion of at least one contaminant from a nanocarbon preparation comprising subjecting the nanocarbon preparation to microwave radiation in the presence of at least one removing agent. A portion indicates some or all of the contaminant can be removed. Thus, in some embodiments, the preparation emerges substantially purified, while in other embodiments, the preparation may be only partially cleansed of a given contaminant. A nanocarbon preparation is any composition containing nano-sized carbon, no matter how prepared, regardless of any processing that composition may have endured. Thus, embodiments of the present invention can be used on freshly-prepared fullerene and carbon nanotube compositions, and on such compositions that have otherwise become contaminated.

Microwave radiation can be applied by any appropriate source. For example, in some embodiments, the inventive method can be carried out in a microwave oven such as a CEM Model 205 system.

The at least one removing agent indicates a solvent or reagent that can remove at least one contaminant from the carbon nanotube preparation. Suitable removing agents include more-polar and less-polar solvents such as water, ethanol, other alcohols, and common organic solvents such as benzene, ether, alkanes, dimethyl formamide, dimethylsulfoxide, acetonitrile, and acetone. Suitable removing agents also include acids, both strong and weak acids, oxidizing agents such as hydrogen peroxide, and chelating agents. Removing agents can be used singly, sequentially, or in combination.

Some embodiments of the present invention selectively remove one contaminant versus another. For example, one embodiment may remove a greater portion of the metal present, while leaving behind a greater portion of the non-tubular carbon present in a carbon nanotube preparation. In another embodiment, the method could remove a nanotubular carbon contaminant while leaving behind the spherical nanocarbon.

Metal removal efficiency is defined by the ratio of metal removed to that originally present. In some embodiments, the metal removal efficiency may range from 20 to 100%, and in other embodiments from 60-100%. The conditions may be any suitable conditions. For example, in some embodiments the bulk reaction temperature may vary from 25° C. to 400° C. and pressure from half an atmosphere to 20,000 psi., while reaction time may vary from 5 sec to 10 hours. In some embodiments, the temperature ranges between 50° C. and 150° C., pressure ranges between 1 to 10 atmosphere and reaction time ranges between 10 sec to 2 hours. The concentration of removing agents may vary widely. In some embodiments, that concentration ranges from highly concentrated removing agents such as, for example, pure acids, to dilute removing agents as low as 0.001 molar. The power of the microwave radiation suitable for a given embodiment varies widely. For some embodiments, the reaction can be carried out with power ranging from 50 to 10000 watts, while in other embodiments, the power range is between 100 to 1000 watts. The reactions may be carried out in a closed, or open vessel, in a batch or continuous mode.

In another embodiment, the microwave purification process is preceded by pretreating involving but not limited to chemical reaction, heating, washing, chemical washing, drying, and oxidation. A washing is a solvent rinse, while a chemical wash in some embodiments includes at least one surfactant. Such pretreating may include more than one of such treatments, for example, a heating and a chemical reaction. In yet another embodiment, post-treating involving but not limited to chemical reactions, oxidation, washing, chemical washing, drying, and washing can be employed. As with pretreating, post-treating steps may be used singly, sequentially, or in combination.

EXAMPLE 1

The chemical processing experiments involved in the present invention were carried out in a microwave oven (a CEM Model 205 system) using a 100 ml reaction chamber, which was lined with Teflon PFA® and fitted with a 0-200 psi pressure controller. Typical single and multiwall carbon nanotube samples containing about 10 weight percent and 1 weight percent of catalytic metals obtained from Carbon Nanotechnologies Inc and Cheap Tubes Inc, respectively, were used for the experiments conducted to demonstrate the invention. All other chemicals used were purchased from Sigma Aldrich Inc. The purified nanotubes were analyzed for metal content with an Analyst 4000 Atomic Absorption Spectrometer. The microstructure of the purified nanotubes were determined by field emission scanning electron microscopy using a LEO 1530 instrument equipped with an energy dispersive x-ray analyzer. The chemical structure of the functional groups on the sidewalls was ascertained by fourier transform infrared (FTIR) spectroscopic measurements of the reacted nanotubes in highly purified KBr pellets using a Perkin Elmer instrument.

In a typical reaction, 5 mg to 15 mg of single or multiwall carbon nanotubes were introduced into a reaction chamber together with 25 ml of different extraction solvents and then the reaction vessel was subjected to microwave radiation. Metal removal reactions were carried out with the microwave power set at 50% of a total of 900 watts and the pressure set at 30 psi for the different times respectively. After reaction, the reacted mixture was filtered and both the solid and solution phases were subjected to chemical analyses by atomic absorption and FTIR spectroscopy.

In order to determine the metal content of the starting CNTs 5 mg of single wall carbon nanotubes and 15 mg of multiwall carbon nanotubes were added to a reaction vessel containing 25 ml of a 1:1 mixture of 70% nitric acid and 97% sulfuric acid. Then the reaction vessel was subjected to microwave reaction. With the microwave power set to 50% of a total of 900 watts and the pressure set at 30 psi, reaction under microwaves was carried out for about 1 hour to totally dissolve the carbon nanotubes in the strong acid. After reaction, the solution was analyzed by atomic absorption spectroscopy.

EXAMPLE 2

A variety of acids could be used to remove the metals from the CNTs. The focus here was to use dilute and weak acids along with complexing agents, so that the CNTs were not functionalized. The percentage of metal removed depended upon the acid used, the duration of microwave treatment, and the specific metal (Fe, Co or Ni).

Tables 1 and 2 shows selected data on the efficiencies of metal removal by microwave reaction of iron and cobalt for single and multiwall carbon nanotubes (MWNTs and SWNTs) respectively, using the various acids. The solvents used were $HNO_3$, $H_2SO_4$, acetic acid (HOAc) and a variety of complexing agents such as, ethylenediaminetetraacetic acid (EDTA) and nitrilotriacetic acid (NTAA). As used herein, "complexing agent" means the same as "chelating agent." The acids were mixed with a saturated solution of EDTA, 1M nitric acid, 1M sulfuric acid, ethanol, 1M hydrochloric acid, 100% acetic acid, 1M acetic acid and deionized water. Typical microwave parameters were 20-50% of the power, 5 to 60 min of reaction time, and 30 psi pressure setting. These conditions needed to be optimized based on the type of nanotube and the source. The metal concentrations were obtained by atomic absorption spectroscopy and compared with energy dispersive x-ray analysis measurements. Using atomic absorption spectroscopy the cobalt content in the starting multiwall nanotubes is 0.466% by weight and the iron content in the starting single wall carbon nanotubes is 10.77% by weight. By comparing the metal contents of the starting nanotubes with the metal contents obtained after each removal procedure, the metal removal efficiency for each process is obtained. Ni was also removed by microwave treatment: 89% of Ni could be removed by reaction with acetic acid in the presence of ADA ($H_2NCOCH_2N(CH_2CO_2H)_2$) and HCl.

TABLE 1

Efficiency of Cobalt removal from MWNT (50% power and 10 min.)

| Reaction Composition | Removal Efficiency % Cobalt |
|---|---|
| 1M $CH_3COOH$ + EDTA Saturated Solution + MWNTs | 54 |
| 25 ml 1M $HNO_3$ + 15 mg MWNTs | 49.7 |
| 25 ml 100% $CH_3COOH$ + 15 mg MWNTs | 30.6 |

TABLE 2

Efficiency of Fe removal from SWNTs (50% power)

| Reaction Composition | Removal Efficiency Fe % |
|---|---|
| 1M $HNO_3$ + SWNTs | 90 |
| Conc. Acetic acid + EDTA + (HCl to PH 3) SWNTs | 78 |
| Conc. Acetic acid + NTAA + (HCl to PH 3) SWNTs | 60.0 |
| 1M HCl + SWNTs | |
| 1M HCl + SWNTs | 7.2 |

EXAMPLE 3

As-prepared multiwall carbon nanotubes with extensive amorphous carbon growth on the surfaces is shown in the scanning electron microscope image in FIG. 4(a). Images taken after a 10 minute treatment at a 50% total microwave power level in a mixture of nitric and sulfuric acid is shown in FIG. 4(b). By comparing the images it is clear that the amorphous carbon growths are removed from the nanotube walls. The average tube diameters remained unchanged in the 20 to 40 nm range.

As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit and intended scope of the invention. Furthermore, the foregoing description of various embodiments does not necessarily imply exclusion. For example, "some" embodiments may include all or part of "other" and "further" embodiments within the scope of this invention.

REFERENCES

[1] S. Iijima, *Nature,* 1991, 354, 56-58.
[2] T. Guo, P. Nikolaev, A. Thess, D. T. Colber, R. E. Smalley, Chem. Phys. Lett. 243 (1995) 49.
[3] P. C. Eklund, P. C.; Pradhan, B. K.; Kim, U. J.; Xiong, Q.; Fischer, J. E.; Friedman, A. D.; Holloway, B. C.; Jordan, K.; Smith, M. W., Nano Letters (2002), 2, 561-566.
[4] Journet, C.; Maser, W. K.; Bernier, P.; Loiseau, A.; Lamy de la Chapells, M.; Lefrant, S.; Deniard, P.; Lee, R.; Fischer, J. E., Nature (London) (1997), 388, 756-758.
[5] P. Nikolav, M. J. Bronikowski, R. K. Bradley, F. Rohmund, D. T. Colbert, K. A. Smith, R. E. Smalley, Chem. Phys. Lett. 313 (1999) 91.
[6] Yao Wang, Fei Wei, Guohua Luo, Hao Yu, Guangsheng Gu, Chem. Phys. Lett. 364 (2002) 568-572.
[7] T. Kato, G.-H. Jeong, T. Hirata, R. Hatakeyama, Thin Solid Films 457 (2004) 2-6.
[8] S. C. Lyu, B. C. Liu, S. H. Lee, C. Y. Park, H. K. Kang, C. W. Yang, and C. J. Lee, J. Phys. Chem. B 2004, 108, 1613-1616.
[9] Anne C. Dillon, A. Hary Mahan, Philip A. Parilla, Jeffery L. Alleman, Michael J. Heben, Kim M. Jones, and Katherine E. H. Gilbert, Continuous Hot Wire Chemical Vapor Deposition of High-Density Carbon Multiwall Nanotubes, nano letters 2003 Vol. 3, No. 10, 1425-1429.
[10] Yi Lin, Apparao M. Rao, Bindu Sadanadan, Edward A. Kenik, and Ya-Ping Sun, Functionalizing Multiple-Walled Carbon Nanotubes with Aminopolymers, *J. Phys. Chem. B* 2002, 106, 1294-1298.

[11] Darron E. Hill, Yi Lin, Apparao M. Rao, Lawrence F. Allard, and Ya-Ping Sun, Functionalization of Carbon Nanotubes with Polystyrene, *Macromolecules* 2002, 35, 9466-9471.

[12] Yi Lin, Bing Zhou, K. A. Shiral Fernando, Ping Liu, Lawrence F. Allard, and Ya-Ping Sun, Polymeric Carbon Nanocomposites from Carbon Nanotubes Functionalized with Matrix Polymer, *Macromolecules* 2003, 36, 7199-7204.

[13] Dragos Ciuparu,* Yuan Chen, Sangyun Lim, Gary L. Haller, and Lisa Pfefferle, Uniform-Diameter Single-Walled Carbon Nanotubes Catalytically Grown in Cobalt-Incorporated MCM-41, J. Phys. Chem. B 2004, 108(2): 503-507.

[14] Jason J. Ge, Dong Zhang, Qing Li, Haoqing Hou, Matthew J. Graham, Liming Dai, Frank W. Harris, and Stephen Z. D. Cheng, Multiwalled Carbon Nanotubes with Chemically Grafted Polyetherimides, *J. Am. Chem. Soc.,* 2005, 127, 9984.

What is claimed is:

1. A method for chemically extracting impurities from nanocarbons, comprising:
    providing a nanocarbon preparation, the nanocarbon preparation including a plurality of nanocarbon structures;
    introducing the nanocarbon preparation and at least one liquid phase removing agent into a vessel to form a suspension of the nanocarbon preparation in the at least one liquid phase removing agent;
    closing the vessel;
    pressurizing the closed vessel;
    subjecting the nanocarbon preparation and the at least one liquid phase removing agent in the closed and pressurized vessel to microwave radiation to cause the at least one liquid phase removing agent to chemically react with and extract a portion of at least one contaminant from the nanocarbon preparation while the nanocarbon preparation and the at least one liquid phase removing agent are subjected to the microwave radiation in the closed and pressurized vessel;
    wherein each nanocarbon structure of the plurality of nanocarbon structures is not functionalized or derivatized by subjecting the nanocarbon preparation to microwave radiation in the presence of the at least one liquid phase removing agent in the closed and pressurized vessel; and
    wherein the at least one contaminant includes at least one metal.

2. The method of claim 1, wherein the plurality of nanocarbon structures is a plurality of carbon nanotubes; and
    wherein the at least one contaminant includes at least one non-tubular carbon.

3. The method of claim 2, wherein the plurality of carbon nanotubes is selected from the group consisting of a plurality of single walled carbon nanotubes, a plurality of double walled carbon nanotubes, and a plurality of multiple walled carbon nanotubes.

4. The method of claim 3, wherein the at least one liquid phase removing agent includes at least one compound that facilitates the oxidation of the at least one non-tubular carbon.

5. The method of claim 1, wherein the at least one liquid phase removing agent includes at least one oxidizing agent.

6. The method of claim 1, wherein the at least one liquid phase removing agent includes at least one acid.

7. The method of claim 6, wherein the at least one liquid phase removing agent further includes at least one chelating agent.

8. The method of claim 7, wherein the at least one liquid phase removing agent further includes at least one oxidizing agent.

9. The method of claim 6, wherein the at least one acid is selected from the group consisting of nitric acid, sulphuric acid, hydrochloric acid, and acetic acid.

10. The method of claim 1, wherein substantially no air or fluid passes through the closed vessel after the closed vessel has been pressurized.

11. The method of claim 1, wherein the at least one liquid phase removing agent includes at least one chelating agent.

12. The method of claim 11, wherein the at least one chelating agent is selected from the group consisting of ethylenediamine tetracetic acid (EDTA), 8-hydroxy quinone nitrilotriacetic acid (NTAA), diphenylthiocarbazole, (dithizone), cupferron, and ammonium pyrrolidine dithiocarbamate (APDC).

13. The method of claim 1, wherein the subjecting the nanocarbon preparation to microwave radiation is carried out for a time ranging from about half a minute to about sixty minutes.

14. The method of claim 1, wherein the plurality of nanocarbon structures is selected from the group consisting of a plurality of $C_{60}$, a plurality of $C_{70}$, a plurality of higher fullerenes, and a plurality of nano-onions.

15. The method of claim 14, wherein the at least one contaminant includes at least one nanotubular carbon.

16. The method of claim 1, further comprising the step of pretreating the nanocarbon preparation prior to subjecting the nanocarbon preparation to microwave radiation.

17. The method of claim 16, wherein the pretreating includes at least one of chemical reaction, partial oxidation, washing, chemical washing, drying, oxidation, or a combination of any of the foregoing.

18. The method of claim 1, further comprising the step of post-treating the nanocarbon preparation after subjecting the nanocarbon preparation to microwave radiation.

19. The method of claim 18, wherein the post-treating includes at least one of chemical reaction, partial oxidation, washing, chemical washing, drying, oxidation, or a combination of any of the foregoing.

20. The method of claim 1, wherein the closed vessel is pressurized to about 20,000 psig.

21. The method of claim 1, wherein after the closed vessel is pressurized, the closed vessel has no free oxygen removed therefrom.

22. The method of claim 1, wherein the plurality of nanocarbon structures is a plurality of spherical nanocarbons; and
    wherein the at least one contaminant includes at least one nanotubular or non-spherical carbon.

23. A method for chemically extracting impurities from nanocarbons, comprising:
    providing a plurality of pre-synthesized nanocarbon structures, the nanocarbon structures being pre-synthesized via any synthesis process;
    introducing the plurality of pre-synthesized nanocarbon structures and at least two liquid phase removing agents into a vessel to form a suspension of the plurality of nanocarbon structures in the at least two liquid phase removing agents;
    closing the vessel;
    pressurizing the closed vessel;
    subjecting the plurality of nanocarbon structures and the at least two liquid phase removing agents in the closed and pressurized vessel to microwave radiation to cause the at least two liquid phase removing agents to chemically react with and extract a portion of at least one contaminant from the plurality of nanocarbon structures while the plurality of nanocarbon structures and the at least two liquid phase removing agents are subjected to the microwave radiation in the closed and pressurized vessel;

wherein the at least one contaminant includes at least one metal;

wherein the at least two liquid phase removing agents include at least one chelating agent and at least one acid;

wherein each nanocarbon structure of the plurality of nanocarbon structures is not functionalized or derivatized by subjecting the plurality of nanocarbon structures to the microwave radiation in the presence of the at least two liquid phase removing agents in the closed and pressurized vessel; and wherein substantially no air or fluid passes through the closed vessel after the closed vessel has been pressurized.

24. The method of claim 23, wherein the plurality of nanocarbon structures is selected from the group consisting of a plurality of single walled carbon nanotubes, a plurality of double walled carbon nanotubes, and a plurality of multiple walled carbon nanotubes.

25. The method of claim 23, wherein the plurality of nanocarbon structures is selected from the group consisting of a plurality of $C_{60}$, a plurality of $C_{70}$, a plurality of higher fullerenes, and a plurality of nano-onions.

26. The method of claim 23, wherein after the closed vessel is pressurized, the closed vessel has no free oxygen removed therefrom.

27. The method of claim 23, wherein the plurality of nanocarbon structures are pre-synthesized via a high-pressure carbon monoxide synthesis process.

28. The method of claim 23, wherein the plurality of nanocarbon structures are pre-synthesized via an arc discharge evaporation synthesis process.

29. The method of claim 23, wherein the closed vessel is pressurized to about 20,000 psig.

30. The method of claim 29, wherein the at least one metal is selectively removed.

31. The method of claim 30, wherein the at least one liquid phase removing agent includes 1M nitric acid and 1M sulfuric acid.

* * * * *